UNITED STATES PATENT OFFICE.

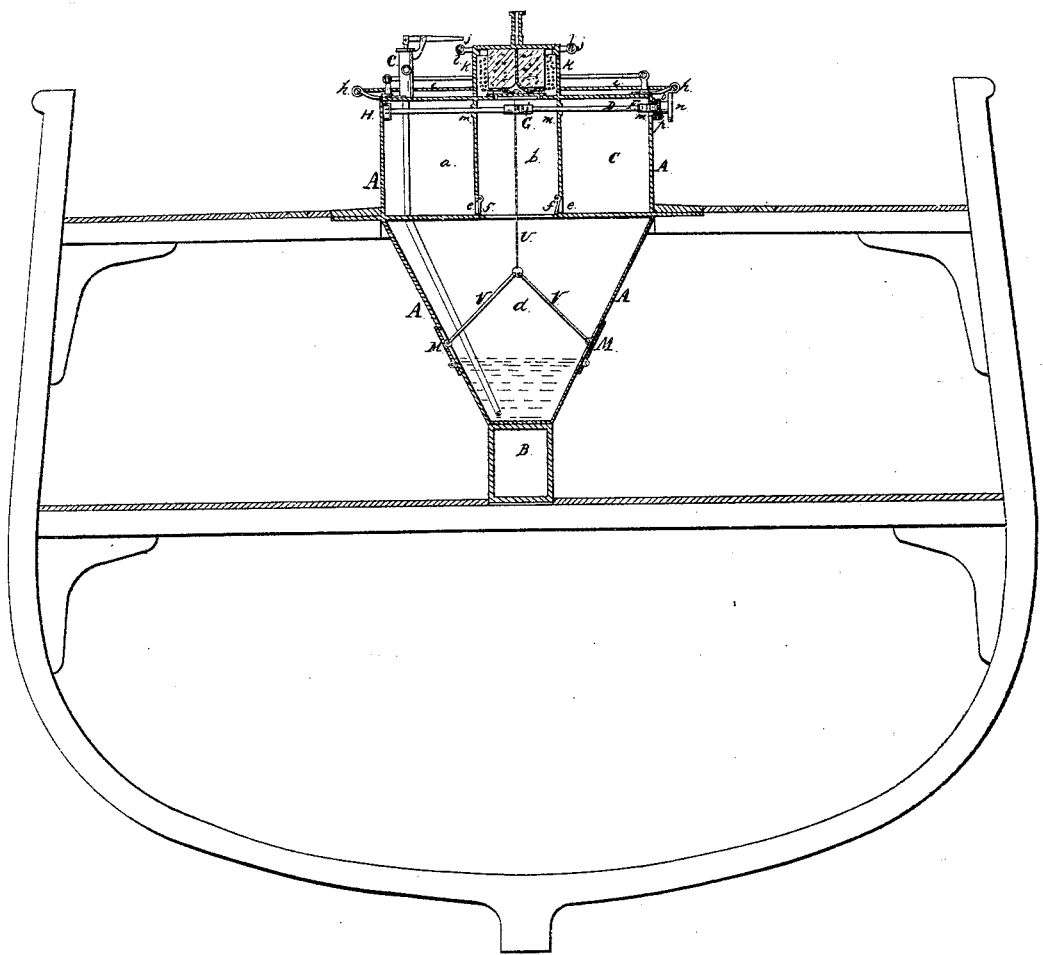

FRANCIS D. LEE, OF CHARLESTON, SOUTH CAROLINA.

LIFE AND TREASURE BUOY.

Specification of Letters Patent No. 20,072, dated April 27, 1858.

*To all whom it may concern:*

Be it known that I, FRANCIS DICKINSON LEE, of the city of Charleston, in the district of Charleston and State of South Carolina, have invented a new and useful Improvement in the Life and Treasure Buoy for which I obtained Letters Patent, dated December 8, 1857; and I do hereby declare that the following is a full, clear, and exact description of my present improvement, reference being had to the accompanying drawings, forming part of this specification, said drawing representing a transverse vertical section of the life and treasure buoy with my improvement and showing the application of the same on board a ship.

This improvement consists in a certain arrangement of the valves for the escape of water, and of the mechanism for operating them and of an air valve to admit air above the surface of the water in the tank to cause the free and rapid expulsion of the water when the escape valves are opened, whereby all the valves are operated in a convenient manner from the upper deck of the ship or vessel on which the tank is employed.

A, is the water tank and B, the attached treasure safe combined and applied on board the ship or other vessel in substantially the same manner as described in the specification of my aforesaid Letters Patent. To prevent the evil effects that during the pitching or rolling of the ship might result from the movement all in one body of so large a quantity of water, as will be contained in the tank, I have divided the tank into compartments $a$, $b$, $c$, $d$, by partitions $g$, $g$, with passages $e$, $e$, between the compartments fitted with valves $f$, $f$, which open by the direct downward pressure of the water to allow the water to subside uniformly in all compartments as it is drawn off for use by the pump C, or other means provided for that purpose, but which are closed one or more at a time by the pressure of the water to confine the water in the compartments as the vessel pitches or rolls violently. I have also attached arms $h$, $h$, to the upper part of the buoy and others $j$, $j$ to the top of the box $k$, which contains the indicating buoy, with eyes at their ends through which are rove ropes $i$, $i$, and $l$, $l$, which serve for persons on the buoy to lay hold of or fasten themselves to.

M, M, are two valves for the escape of water from the tank when it is to be used as a buoy, the said valves being arranged in opposite positions in or near the bottom of the tank and being hinged and fitted to the tank to open outward by the pressure of the water on their interior, but being kept closed till it is desired to let the water escape, by means of rods V, V, connected with a rope or chain U, which is wound up on a windlass G, and thereby caused through the agency of the rods V, V, to draw the valves tight to their seats. The shaft D, of the windlass is arranged horizontally in bearings $m$, $m$, in the upper part of the tank that is above the upper deck of the vessel, and one end of it passes through the tank and is provided outside with a hand wheel $n$, or crank or its equivalent which stands in a convenient position to turn the shaft to wind up the cord or chain. The said shaft is also furnished outside the tank and near the wheel $n$, or its equivalent, with a ratchet wheel $o$, which is engaged by a pawl $p$, to keep the rope or chain wound up and the escape valves M, closed till they are desired to open. The opposite end of the windlass shaft D, to that which carries the wheel $n$, or its equivalent has attached to it the air valve H, which fits to an opening in the side of the tank, and the said shaft is furnished with a screw thread F, which works through a fixed nut in the side of the tank opposite to the valve, for the purpose of causing the shaft to move longitudinally in a direction to close the valve, when it receives a rotary motion to wind up the rope or chain, and to move longitudinally in a direction to open the valve when it receives a rotary motion to let off the rope or chain.

By the above arrangement of the escape valves, windlass, rope or chain, rods, air valve and screw, convenience is afforded for opening the escape valves for the escape of the water from the tank and re-closing them to convert the tank into a buoy, after all the persons have assembled on the tank, without rendering it necessary for any person to go below the deck to open the valves. The captain or other officer or appointed person, stationed near the wheel $n$, lifting out the pawl $p$, from the ratchet wheel $o$, leaves the escape valves M, M, free to open by the pressure of the water, and the rotary motion of the windlass shaft D, caused by the unwinding of the rope or chain causes the opening of the valve H, through the agency of the screw F, on the windlass shaft D, and thus air is admitted above the surface of the water to prevent the formation of a vacuum in the upper part of the tank and consequent retardation of the escape at the valves. If the escape valves M, M, do not open freely the windlass shaft can be turned by hand to unwind the rope or chain and open the valve H. When the water or as much of it as is desired has escaped, the valves M, M, and H, are closed simultaneously to make the tank water tight by turning the windlass shaft in a direction to wind up the rope or chain U.

What I claim as my invention and desire to secure by Letters Patent, is—

The arrangement of the escape valves M, M, rods V, V, chain U, windlass G, and the air valve H, and screw F, on the windlass shaft, to operate in the manner set forth.

FRANCIS D. LEE.

Witnesses:
  HENRY T. BROWN,
  S. H. WALES.